United States Patent Office 3,466,431
Patented Sept. 9, 1969

3,466,431
D.C. POWER SPECTRUM AND FOURIER TRANSFORM ANALYZER
Abraham M. Fuchs, Rydal, and Salvatore C. Catania, Cornwells Heights, Pa., assignors to Weston Instruments Inc., Newark, N.J., a corporation of Delaware
Filed Dec. 30, 1966, Ser. No. 606,205
Int. Cl. G06g 7/19, 7/36
U.S. Cl. 235—151.3     12 Claims

ABSTRACT OF THE DISCLOSURE

A DC power spectrum and Fourier transform analyzer for time varying signals which are analyzed over a plurality of analysis frequencies. For computing the power spectrum, a time varying signal is applied through a band pass filter, multiplied by the sine and cosine of an analysis frequency, applied to a low pass filter with the resultant signal being squared and averaged. The analog generation of the sine and cosine analysis frequency is combined with the multiplication function into one resistor-switching operation.

---

This invention relates to a D.C. power and cross power spectrum and Fourier transform analyzer. Prior power spectrum analyzers have been used with time varying random and periodic function signal inputs. Such signals generally comprise a plurality of frequencies superimposed one on another. The analyzer has the basic function of resolving which frequencies are the most prominent, i.e., which frequencies have the most power content. Thus, for a practical application, a frequency-power profile of a band of time varying signals may be computed.

A time varying signal $x(t)$ extending over a period T may be transformed intot he frequency domain to derive spectral information by use of a Fourier transform:

(1) $$F[x(t)] = \int_0^T X(t) e^{-jw_0 t} dt = H(jw_0)$$

Since $e^{-jw_0 t} = \cos w_0 t - j \sin w_0 t$, Equation 1 may be expanded:

(2) $$\int_0^T x(t) \cos w_0 t\, dt - j \int_0^T X(t) \sin w_0 t\, dt = ReF[x(t)] - jImF[x(t)]$$

Since $F[x(t)]$ has real and imaginary parts, the magnitude of the Fourier transform $|F[x(t)]|$ may be expressed (3) $$\sqrt{[RF\{x(t)\}]^2 + [IF\{x(t)\}]^2}$$

Thus, the power spectral density $\phi_{xx}$ of $x(t)$ at a desired analysis frequency $w_0$ for a signal of duration T is obtained by the expression:

(4) $$\phi_{xx} = \frac{1}{T} |F[x(t)]|^2$$

The power spectral density of $x(t)$ may be defined as the magnitude of the transfer function of $x(t)$ [Equation 3] squared.

The time varying signal of $x(t)$ may be an input to a system under test and the output of that system may be a time varying signal. For $y(t)$, as in Equation 3, the magnitude of the Fourier transform may be expressed:

The output power spectral density $P_{yy}$ of $y(t)$ is computed by squaring the magnitude of the transfer function of Equation 5:

(6) $$\theta_{xx} = \frac{1}{T} |F[y(t)]|^2$$

The cross power density between $x(t)$ and $y(t)$ may be computed by taking the real and imaginary parts of the Fourier transforms of $x(t)$ and $y(t)$ in the manner well known in the art. Further, the magnitude of the system transfer function $/G(jw_0)/$ may be obtained by dividing $\phi_{xy}$ by $\phi_{xx}$. Cross power analyzers are described and illustrated in detail in WADC Technical Report, 59–241, Survey of Analog Cross-Spectral Analyzers, Wright Air Development Division, Wright-Paterson A.F.B., December 1959.

A system for computing the power spectrum of a single time varying signal $x(t)$ over a plurality of analysis frequencies may comprise a variable band pass filter for rejecting all but the frequencies in a band around a selected analysis frequency. The sine and cosine of the analysis frequency are generated and a first multiplier is used to multiply the output of the band pass filter times the sine of the analysis frequency to produce a first product signal corresponding to $x(t) \sin wt$.

A second multiplier is used to multiply the output of the band pass filter times the cosine signal to produce a second product signal corresponding to $x(t) \cos wt$. A first low pass filter is connected to the first multiplier for passing frequencies below a predetermined substantially low frequency value and provides at the output a signal corresponding to the imaginary part of the Fourier transform of Equation 3. Similarly, a second low pass filter is connected to the second multiplier to provide at the output asignal corresponding to the real part of the transform of FIG. 2. The signals corresponding to the imaginary and real parts of the Fourier transform are respectively squared, added and average to obtain a signal proportional to the power spectral density of the time varying signal $x(t)$.

For computing cross power spectral density, dual channels each similar to that described above are used, one channel for $x(t)$ and one channel for $y(t)$.

The foregoing analyzers have required the separate generation of the sine and cosine of the analysis frequency as well as the separate multiplication of these signals times the time varying signals. These separate operations have had an adverse effect in the analyzer on (1) the dynamic range, (2) the upper operating frequency limit, (3) the size and complexity of circuitry and (4) reliability.

Accordingly, an object of the present invention is an analyzer in which the generation of sine and cosine reference signals is combined within the multipliers in the form of a single resistor-switching system, thereby to increase the dynamic range and reliability of the analyzer while substantially decreasing its size and complexity.

In accordance with the present invention in one form thereof, there is provided a cross power spectrum analyzer having a first and a second channel. For both channels, a generator produces first switching signals having an ordered pattern in accordance with $\sin w_0 t$ and second switching signals having an ordered pattern in accordance with $\cos w_0 t$. Each of the channels includes a first and a second multiplier each having a variable gain device. Each device has connected thereto an array of resistor switching stages which provides a variable input connected between the output impedance for the respective variable gain device.

The first switching signals are applied to each array of switching stages associated with first multipliers and the second switching signals are applied to each array associated with second multipliers. In this manner, the gain of the first multipliers is varied in steps as a function of $\sin w_0 t$ to produce a product signal corresponding to the respective time varying signal times $\sin w_0 t$. Similarly, the gain of the second multipliers is varied in steps as a function of cos $w_0 t$, to produce a product signal corresponding to the time varying signal times cos $w_0 t$.

For further objects and advantages of the invention and for description of its operation, reference is to be had to the following detailed description taken in conjunction with the accompanying drawings in which:

FIG. 1, comprising

Figure 1A:
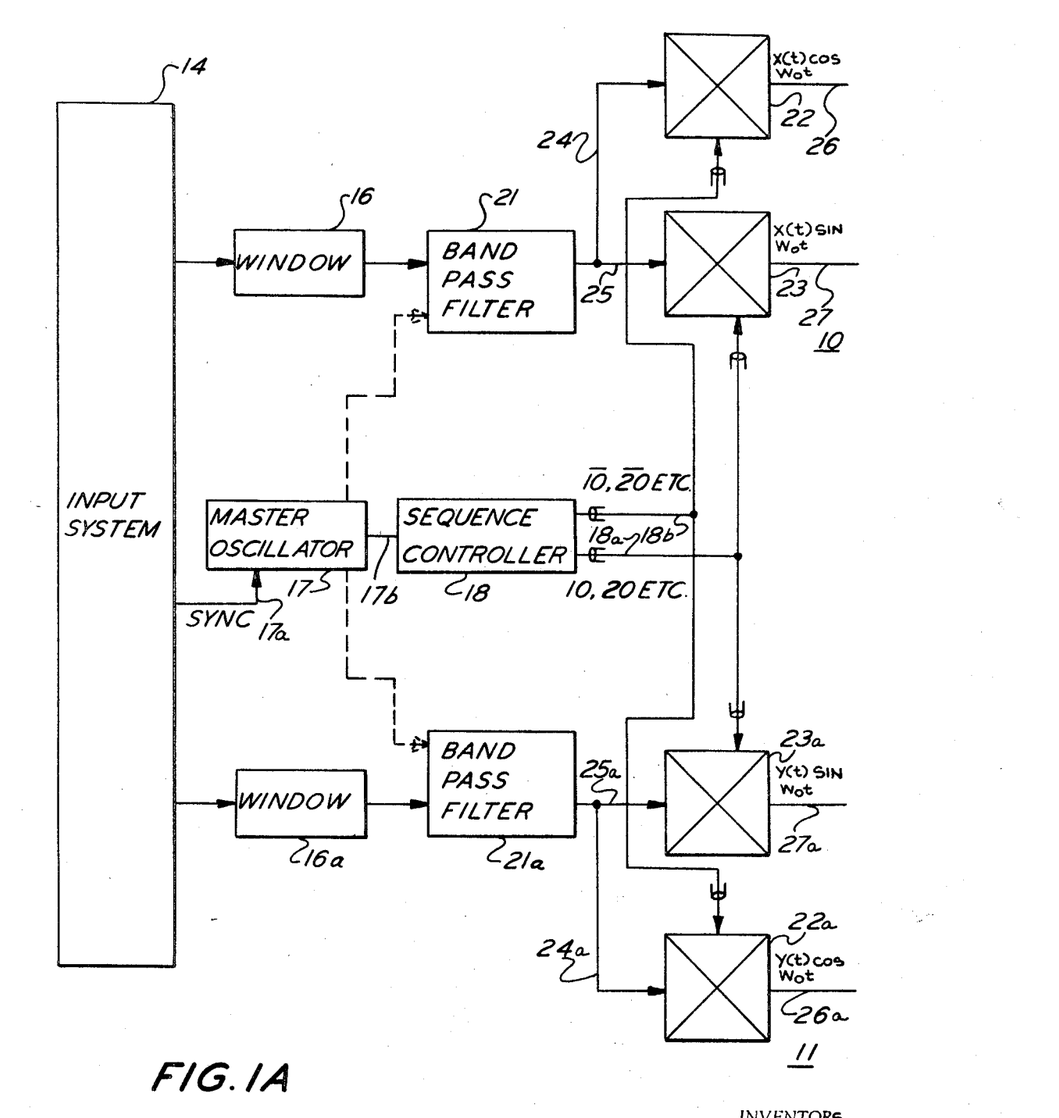
FIGURES 1A and 1B, illustrates in block diagram a cross power spectrum analyzer embodying the invention.
Figure 1B:
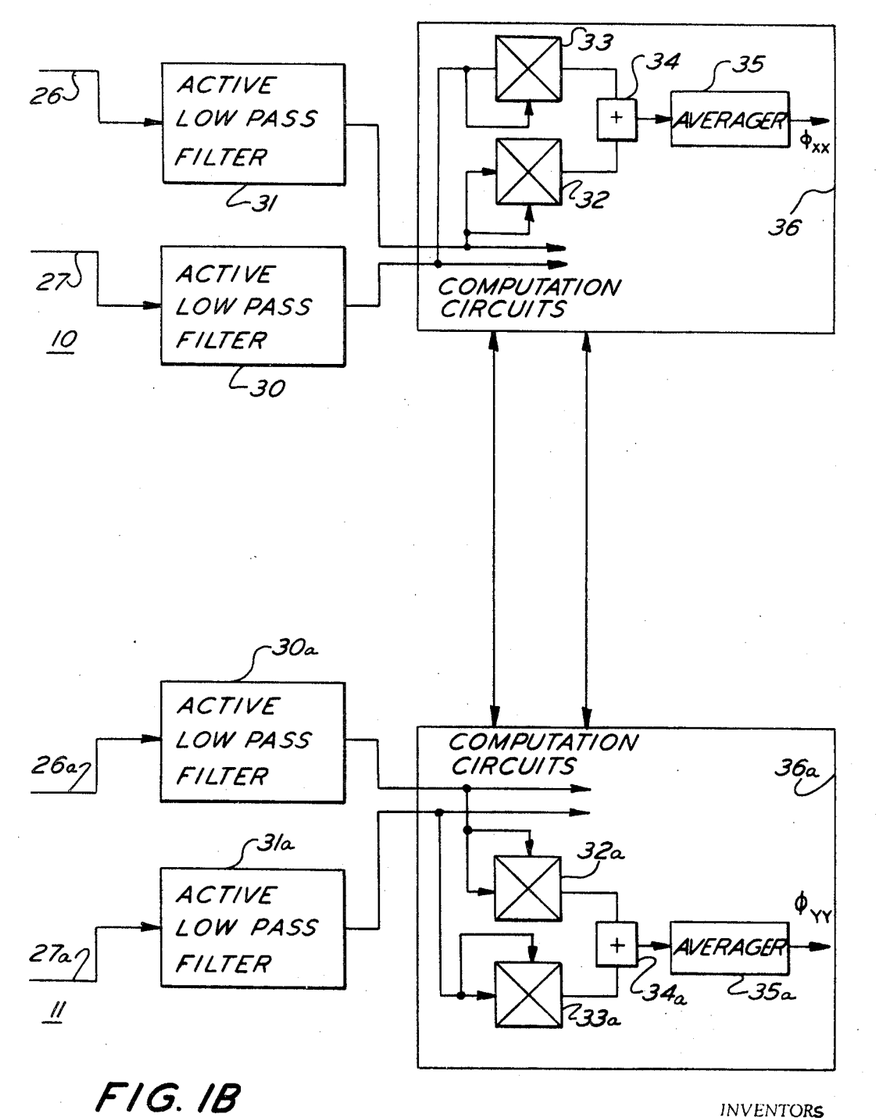

Referring now to FIG. 1, there is shown a portion of a DC analog combined power and cross power spectrum analyzer of the type described in detail in patent application Ser. No. 393,435 filed Aug. 31, 1964 by Abraham M. Fuchs and assigned to the same assignee as the present invention. The basic analyzer comprises a first channel 10 and a second channel 11. A first of two time varying signals $x(t)$ is operated upon by channel 10 and a second of two time varying signals $y(t)$ is operated upon by channel 11. Channels 10 and 11 have identical components which have been identified by similar reference characters. $x(t)$ may be considered an input signal to a system to be tested as per example, an accelerometer, and $y(t)$ is output signal.

The basic machine when performing spectrum analysis, operates on the two time varying signals $x(t)$ and $y(t)$ which may be derived from magnetic tape to compute the input and output power spectral densities and the cross power spectral density. The foregoing may be computed frequency by frequency as the analysis takes over a desired spectrum of test frequencies. Some prior cross power analyzers are described and illustrated in detail in the cited WADC Technical Report. It will be understood that each of the channels 10 and 11 may operate separately as a power spectrum analyzer for an individual time varying signal.

In operation, input system 14 provides a magnetic tape recording of signals $x(t)$ and $y(t)$ with each of the signals being applied through respective high pass, active filters within input system 14. The cutoff frequencies of the high pass filters may be selected at desired frequencies depending on the spectrum $x(t)$ and $y(t)$. The resultant $x(t)$ signal is applied to a window 16 and the resultant $y(t)$ signal is applied to a window 18. Windows 16 and 18 are controlled by a synchronizer in response to a signal on the magnetic tape so that the $x(t)$ and $y(t)$ signals respectively are propagated through windows 16 and 18 only during the period when it is desired to analyze these signals.

The outputs of windows 16 and 16a are applied to band pass filters 21 and 21a respectively each of which comprises a variable active band pass filter having a predetermined high and low cutoff frequencies controlled by a master oscillator 17. Filters 21 and 21a restrict the input in their respective channels 10, 11 to the frequency range of interest centered about a selected analysis frequency $w_0$. Specifically, these filters remove signals outside the field of interest and noise. In those instances where the greatest energy content of the input signal is at frequencies considerably above or below the analysis frequency, $w_0$, the system can be scaled to very accurate sensitivity levels so that analysis down into the noise level of the tape recorder becomes feasible.

The analysis frequency $w_0$ is controlled by a master oscillator 17 which provides a series of pulses having a pulse repetition frequency which may be varied between two limits. The output of oscillator 17 is applied to a sequence controller 18 which produces differing control signals at a plurality of outputs formed into cables 18a and 18b as will later be described in detail. The signal outputs of cable 18b are the complement of the signal outputs of cable 18a. Cable 18a is applied to multipliers 23 and 23a with individual outputs being connected to separate switching stages of multipliers 23 and 23a. Each of the switching stages includes a switching circuit connected to a differing valued resistor. The switching circuits are sequentially actuated to their circuit closing position by the control signals, thereby to vary the gain of the multipliers proportional to different sinusoidal segments. In this manner, multipliers 23 and 23a multiply the output of the band pass filters 21 and 21a respectively times the sine of the selected analysis frequency to produce a first product signal corresponding to $x(t)$ sin $w_0 t$ and $y(t)$ sin $w_0 t$ respectively.

It will be understood by those skilled in the art that the output of multiplier 23 for example may be expressed as a signal comprising both the sum and difference of the frequency of the time varying signal $x(t)$ and the frequency $w_0$. Similarly, the output of multiplier 23a may be expressed as a signal comprising the sum and difference of the time varying signal $y(t)$ and the frequency $w_0$.

In similar manner, multipliers 22 and 22a each comprise a plurality of switching stages with each stage including a switching circuit connected to a differing valued resistor. Cable 18b is connected to each of the switching stages for sequentially actuating the switching circuits thereby to vary the gain of multipliers 22 and 22a proportional to differing cosinusoidal segments. Multipliers 22 and 22a multiply the output of band pass filters 21 and 21a respectively times the cosine of the analysis frequency to produce a product signal corresponding to $x(t)$ cos $w_0 t$ and $y(t)$ cos $w_0 t$ respectively. It will be understood by those skilled in the art that the output produced by multipliers 22 and 22a may be expressed as a signal comprising the sum and difference of the frequency $w_0$ and the frequency of the time varying signals $x(t)$ and $y(t)$ respectively. For multipliers 22, 22a and 23, 23a in order to provide for the multiplication of sin $w_0 t$ and cos $w_0 t$ simultaneously with the beginning of $x(t)$ and $y(t)$, a sync signal from the synchronizer of the input system 14 is applied to master oscillator 17 by way of an input 17a.

The outputs of multipliers 23 and 23a are applied to respective active low pass filters 30 and 30a which are effective to pass only a difference frequency component. Specifically, filters 30 and 30a each comprise an operational amplifier having precision resistors and capacitors connected across the amplifier so that the filter exhibits a desired transfer function. Therefore, the output of low pass filter 30 provides an output signal corresponding to the imaginary component of the Fourier transform (Equation 2) of $x(t)$, viz, $ImF(x(t))$. Similarly, the output of filter 30a is a signal corresponding to the imaginary component of the Fourier transform of $y(t)$, viz, $ImF(y(t))$.

In similar manner, the outputs of multipliers 22 and 22a are respectively applied to active low pass filters 31 and 31a which are effective to pass only the difference frequency components and are of similar construction to filters 30 and 30a. Accordingly, filter 31 is effective to provide an output signal corresponding to the real component of the Fourier transform of $x(t)$, viz, $ReF(x(t))$. Similarly, filter 31a provides an output signal corresponding to the real component of the Fourier transform of $y(t)$, viz, $ReF(y(t))$.

For channel 10 to compute input power spectral density for $x(t)$, the output of filters 30 and 31 are applied to squaring circuits 32 and 33 respectively of computation circuit 36. The squared outputs are summed by summing circuit 34 with the resultant signal integrated by an averager 35 thereby generating a signal proportional to spectral density.

Similarly, for channel 11, the output power spectral density for $y(t)$ may be computed in the following manner: The outputs of filters 30a and 31a are applied to squaring circuits 32a and 33a respectively of computation circuits 36a. The squared outputs are summed by a summer 34a, averaged by an averager 35a to result in a signal proportional to the output power spectral density.

In order to compute the copower or in phase spectrum of $x(t)$ and $y(t)$, the outputs of filters 31 and 31a are multiplied together by circuit 36 to form a product. The outputs of filters 30 and 30a are multiplied together to form another product. The two products are added and integrated to provide a signal proportional to the copower spectrum $Re(\phi_{xy})$.

The quadrature or out of phase power spectrum of $x(t)$ and $y(t)$ is derived by multiplying the outputs of filters 30 and 31a to provide a first product and by multiplying the outputs of filters 31 and 30a to form a second product. The first product is subtracted from the second product with the resultant signal being averaged to provide a signal proportional to the quadrature power spectrum $Im(\phi_{xy})$.

The total cross power spectral density $\phi_{xy}$ between $x(t)$ and $y(t)$ may be generated in the following manner: the copower and quadrature power signals are each respectively squared by computation circuits 36 and 36a. The resultant signals are summed and the square root taken of the resultant sum. The resultant sum is a signal proportional to the magnitude of the cross power spectral density. The phase angle of $\phi_{xy}$ is computed by taking the arc tangent of the quadrature power divided by the copower.

Figure 3A:
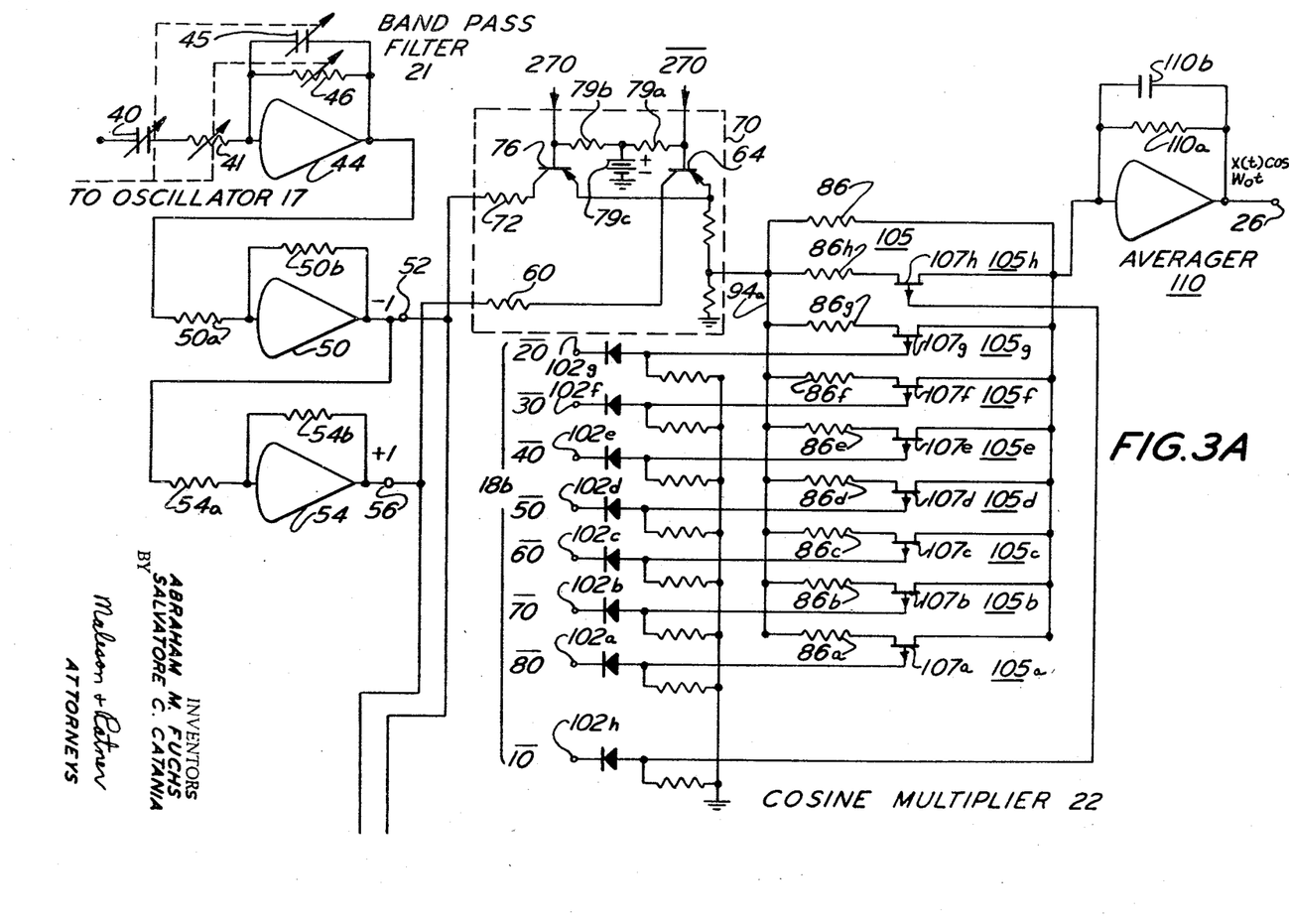
FIGS. 3A–3B illustrate in detail multipliers of one of the channels of FIG. 1.
Figure 3B:
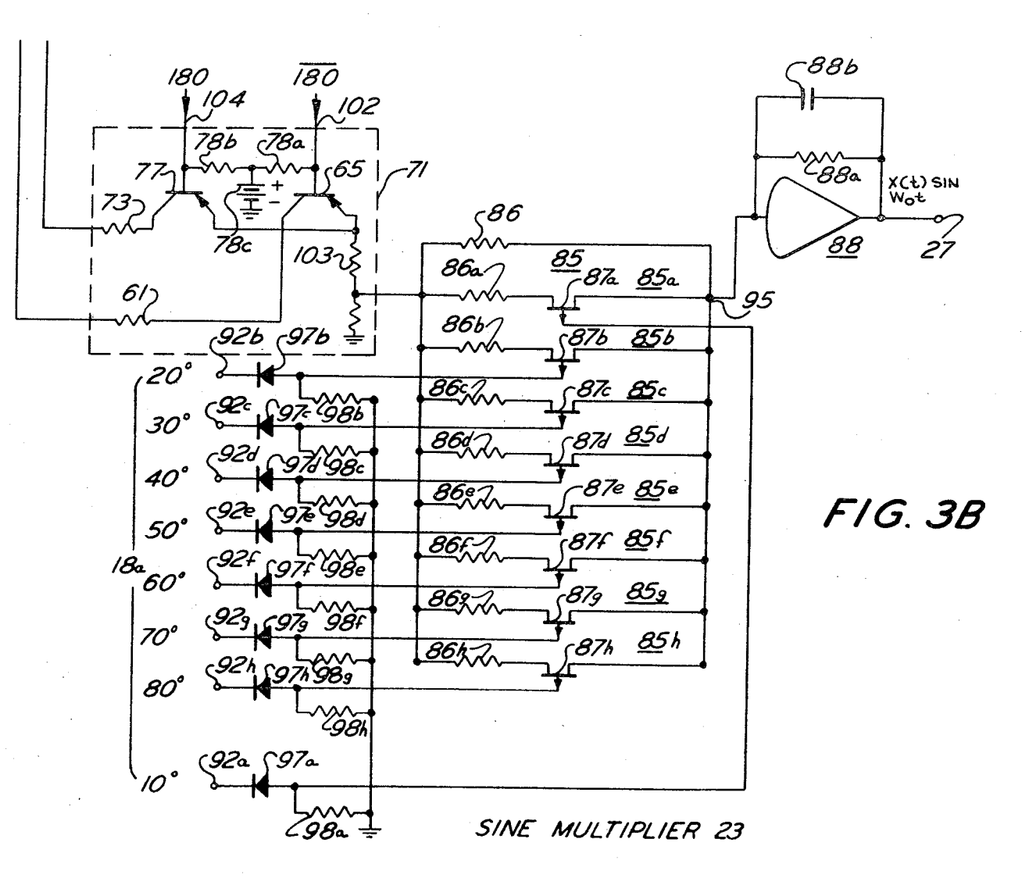

Referring now to FIGS. 3A–3B, there is shown in detail band pass filter circuit 21 and multipliers 22 and 23 of channel 10. It will be understood that filter 21a and multipliers 22a and 23a of channel 11 are of identical structure and operation.

The time varying signal to filter 21 from window 16 is applied by way of a capacitor 40 and a resistor 41 to the input of a high gain DC operational amplifier 44 having resistor 46 and a capacitor 45 each connected in shunt across amplifier 44. Capacitors 40 and 45 and resistors 41 and 46 are variable in value thereby to change the band of passed frequencies. It will be understood that the center of the band of frequencies is $w_0$ which is the selected frequency at which analysis is being performed and filter 21 provides 6 db attenuation at $w_0$ and 6 db per octave slope from the center frequency.

The output of filter 21 is applied to an inverting DC operational amplifier 50 having an input impedance 50a and a feedback impedance 50b selected so that the amplifier system has a gain of one with the output 52 of amplifier 50 being inverted with respect to its input. Output 52 of amplifier 50 is applied to an input of an additional inverting DC operational amplifier 54 having an input resistor 54a and a feedback resistor 54b selected so that the amplifier system has a gain of one with the output 56 of amplifier 54 being inverted wtih respect to its input. In this manner, the output of filter 21 is inverted once by amplifier 50 and is inverted twice by amplifier 54. Thus, outputs 52 and 56 have the same impedance with respect to ground and the signals at outputs 52 and 56 are identical in magnitude and opposite in sign.

Output 56 is applied by way of resistors 60 and 61 to the collectors of first switching transistors 64 and 65 respectively of polarity switching circuits 70 and 71 respectively. Similarly, output 52 is applied by way of respective resistors 72 and 73 to the collectors of second switching transistors 76 and 77 respectively of polarity switching circuits 70 and 71, respectively. A turn off bias is applied to the bases of transistors 65 and 77 from the positive side of a battery 79c by way of resistors 79a and 79b respectively.

Figure 2A:
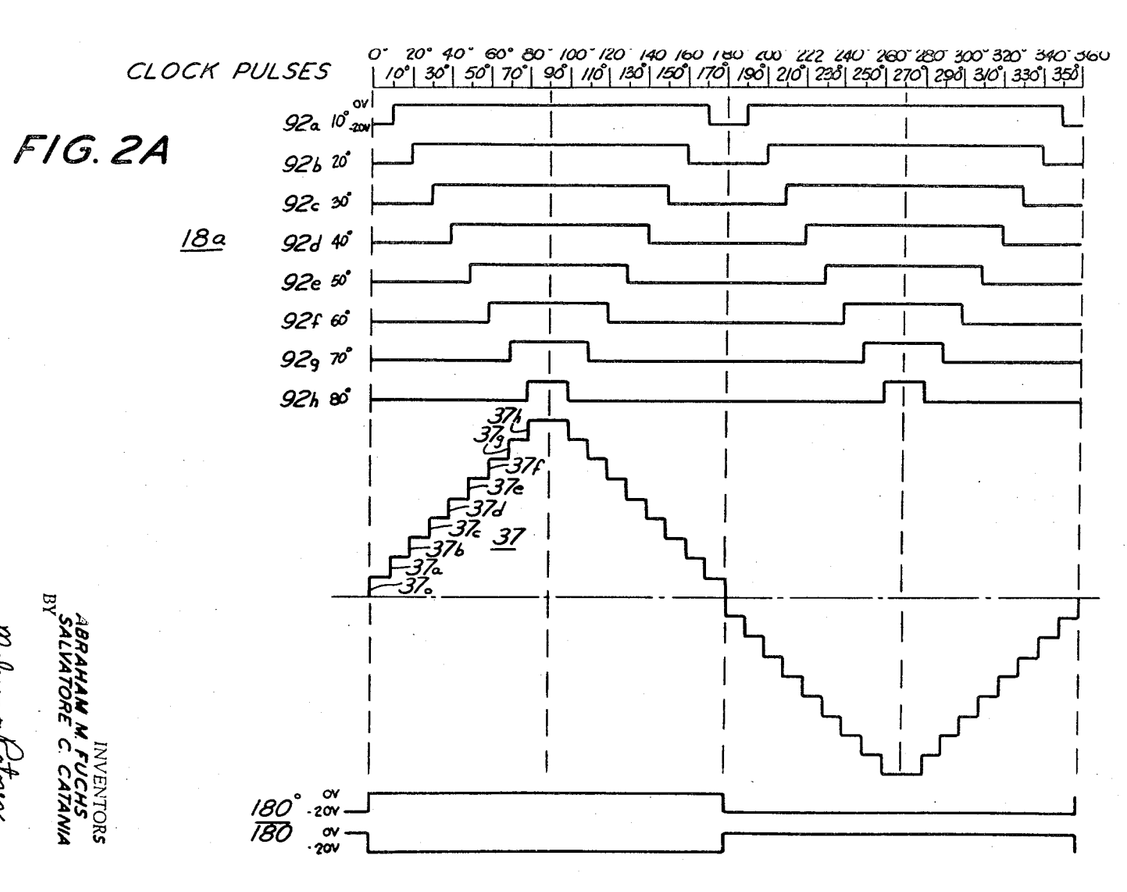
FIGS. 2A–2B illustrate waveforms helpful in explaining the operation of the system of FIG. 1.
Figure 2B:
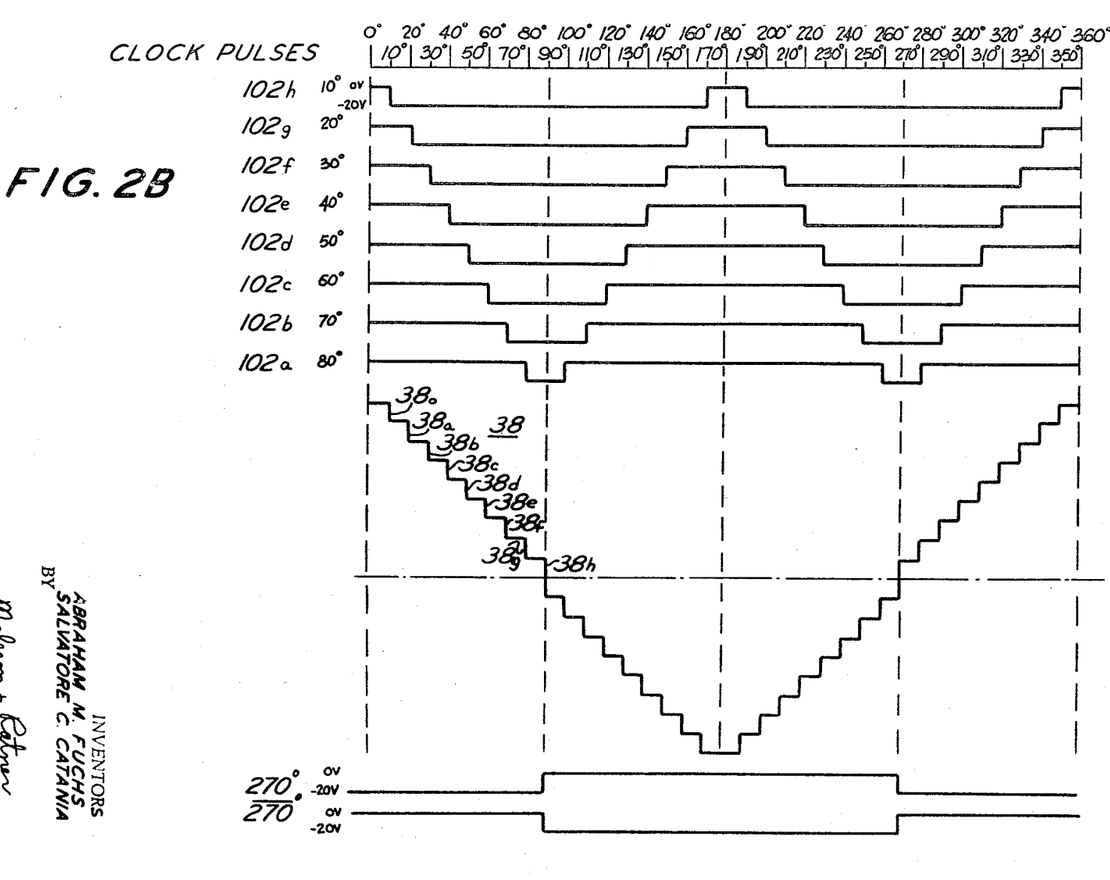

Polarity switching circuit 71 forms a portion of sine multiplier 23 and provides common input signals to a plurality of switching stages 85 which provide voltage control of a variable gain device in the form of an operational amplifier 88. Amplifier 88 has a feedback resistor 88a connected in parallel with a capacitor 88b so that it operates as an averager. Sequence controller 18 provides control of switching signals which are a function of the selected analysis frequency $w_0$. Controller 18 provides switching signals having an ordered pattern in accordance with $\sin w_0 t$ and switching signals in accordance with $\cos w_0 t$. More particularly switching signals are applied to each of the stages 85 by way of cable 18a and to the polarity switching circuit 71 so that the gain of averager 88 is varied in steps as a function of $\sin w_0 t$. If the input to multiplier 23 from filter 21 is a D.C. signal having a predetermined value K then multiplier 23 multiplies that D.C. value times $\sin w_0 t$ to produce an output stepped sinusoidal waveform at output 27 having a value $K \sin w_0 t$. The resultant output signal 37 is illustrated in FIGS. 2A–2B for $K=1$. On the other hand, if the signal from filter 21 is a sinusoidal waveform at a frequency $w_0$, for example, then output 27 produces a sine square function output waveform.

Multiplication using voltage controlled variable gain devices are well known in the art and are described, for example, in Korn and Korn, Electronic Analog and Hybrid Computers, McGraw-Hill, 1964, Chapter 7. In such known multipliers, a feedback scheme is used to make the gain of two or more similar voltage controlled variable gain devices accurately proportional to one of two multiplier input unknown voltages. However, in FIGS. 3A–3B only a single unknown voltage (the time varying signal from filter 21) is applied to multiplier 23. Multiplication of that signal takes place as a result of the step changing of the effective gain of averager amplifier 88 by means of an array stage 85 in accordance with $\sin w_0 t$. The gain of amplifier 88 is equal to the valve of its feedback resistance 88a divided by its input resistance. Thus by sequentially decreasing the effective value of the input resistance corresponding to differing sinusoidal segments, the gain is increased in similar correspondence.

Specifically, the output of polarity switching circuit 71 is applied by way of a common conductor 94 to one end of each of switching circuits 85a–h. In addition, the output of circuit 71 is connected to one side of an input resistor 86. The other side of resistor 86 and the other side of the switching circuits 85a–A are connected together at a common junction 95 which is connected to an input of averager 88. Each of the switching stages 85a–h comprises a gain varying input resistor 86a–h respectively having one end connected to conductor 94 and the other end connected to the source terminal of switching transistors 87a–h respectively. Transistors 87a–h may be N channel field effect transistors and provide the switching function for stages 85a–h respectively. The drain terminal of each of transistors 87a–h are connected to terminal 95. In this manner, as each of transistors 87a–h is turned on, it is effective to connect its respective gain varying resistor 86a–86b in parallel with input resistor 86.

In order to switch stages 85a–h the gate terminal of each of transistors 87a–h is applied by way of a respective diode 97a–h from anode to cathode to terminals 92a–h respectively which form cable 18a. The anodes of diodes 97a–h are connected to ground by way of resistors 98a–h respectively. The transistors 87a–h are sequentially turned on by means of step switching signals from controller 18 for each successive 10° segments of a sine wave 37 from 0° to 90° as shown in FIGS. 2A–2B. From 90° to 180°, transistors 87a–h are sequentially turned off in turn for each 10° segment. During the initial 180° of sine wave 37, controller 18 provides a negative going signal at a 180 output 102 of the 180 flip-flop which is effective to turn on transistor 65. Thus output 56 is applied by way of resistor 61, conductive transistor 65, resistor 103 to conductor 94. In this manner, the uninverted output of filter 21 appears as an input signal to be multiplied by multiplier 23. On the other hand, between 0°–180° output 105 of 180 flip-flop provides a positive going signal to transistor 77 thereby to maintain that transistor turned off.

As shown in FIGS. 2A–2B at 0° all of the switching signals applied to terminals 92a–H are in a negative going direction which are effective to turn on all of the diodes 97a–h respectively. Accordingly, the foregoing negative going signals are applied to the gate terminals of transistors 97a–h respectively thereby to turn off those transistors. Accordingly, between 0°–10°, the input resistance of averager amplifier 88 comprises only input resistor 86. Resistor 86 is selected of value with respect to the feedback resistor 88a so that amplifier 88 provides an initial step $37_0$. At 10°, a positive going control or switching signal is applied to the 10 terminal 92a thereby to turn off diode 97a. Thus, the gate terminal of transistor 87a is connected to ground by way of resistor 98a and that transistor is turned on. Accordingly, from 10° to 20°, the input resistance of averager 88 is the parallel combination of resistors 86 and 86a thereby to decrease the input resistance and to increase the gain of amplifier 88. With an assumed input D.C. signal from filter 21, it will be understood that between 10°–20°, output 27 of averager 88 produces a positive going potential of a predetermined incremental step value 37a with respect to the first stop $37_0$.

In similar manner, at 20°, a positive going signal is applied to terminal 92B thereby to turn off diode 97b and to turn on transistor 87b. Accordingly, between 20°–30°, the effective input impedance for amplifier 88 is the parallel combination of resistors 86, 86a and 86b. This decrease of input impedance increases the previous gain of the amplifier 88 to provide the next incremental step 37b of sine wave 37 produced at output 27. It will be understood that the values of resistors 86, 86a and 86b are selected so that the magnitude of step 37b is equal to the magnitude of steps $37_0$ and 37a.

The foregoing operation continues in turn for a positive going signal at terminal 92c and 30°, a positive going signal at terminal 92d at 40°, and so on until a positive going signal is applied to terminal 92h at 80° of sine wave 37. Thus, it will be understood that each of the transistors 87c–h are sequentially turned on to add resistors 86c–h respectively in parallel with parallel connected resistors 86, 86a and 86b. Each of the resistors is selected so that each of the steps 37c–h is substantially equal in magnitude.

It will now be understood that the effective input resistance of amplifier 88 is decreased in turn to correspond with each 10° segment of the first 90° of sine wave 37. With the effective input resistance being decreased, the gain is sequentially increased corresponding to each 10° segment. In this manner, multiplication of the input time varying signal is produced to provide $x(t) \sin w_0 t$.

The operation of multiplier 23 from 90°–180° will now be described. The positive going pulse is maintained at terminal 92h between 80° and 100° at which time it changes to a negative going potential. Thus, at 100° diode 97h is turned on and transistor 87h is turned off. In this manner, resistor 86h is removed from the parallel combination and the gain of amplifier 88 decreased by an incremental step. The foregoing continues for succeeding 10° steps at terminals 92g–92a respectively until 180°. At 180°, the 180° flip-flop is switched so that transistor 77 is turned on and transistor 65 is turned off thereby to reverse the polarity of the input applied to multiplier 23 from filter 21.

The above description for the differing segments of sine wave 37 at output 27 between 0°–180° is similar to that between 180° and 360°, except that the input D.C. signal is inverted. Thus, at 190°, resistor 86a is connected in parallel with resistor 86 to provide an increase in the gain of amplifier 88, thereby to increase the absolute magnitude output in a negative going direction. The foregoing operation continues for each of the succeeding 10° steps until 260° to provide a maximum gain for amplifier 88 and a maximum absolute output at output 27. From 280° until 360° in 10° steps, the effective gain of amplifier 88 decreases as the input resistance of amplifier 88 increases.

While only one cycle of the sinusoidal wave 37 has been described, it will be understood that the foregoing operation continues for succeeding cycles. It will also be understood that the DC signal at the output of filter 21 has been assumed for purposes of illustrating a sinusoidal waveform at output 27. In practice, the output of filter is time varying signal $x(t)$ so that the output 27 is a complex waveform indicating the product of a stepped sinusoidal varying gain and the output of filter 21. The number of steps of the sinusoidal waveform 37 has been selected to minimize harmonic distortions in the multiplication. Further, the value of resistors 86–86h have been selected so that the magnitude of each of the steps 37a–37h is equal with the resultant wave shape of the varying gain forming a substantially sinusoidal wave shape.

The operation of the cosine multiplier 22 is similar in operation to that of the sine multiplier 23, except that the cosinusoidal waveform is 90° out of phase with the sinusoidal waveform. Accordingly, at 0°, the cosinusoidal waveform 38 is at the maximum positive potential and decreases in 10° steps. In order to accomplish the multiplication by the cosine of the analysis frequency, the 270° output of the 270 flip-flop is applied to the base of transistor 76 and the $\overline{270}$ output is applied to the base of transistor 64. Accordingly, at 0° transistor 64 is turned on and transistor 76 turned off and at 90°, transistor 76 is on and transistor 64 is off. The output of polarity switching circuit 70 is applied by way of a common conductor 94a to one end of each of switching circuits 105a–h which are similar to but reversed in order from switching stages 85a–h thereby to provide a stepped cosinusoidal varying gain for amplifier 110.

Stages 105a–h are reversed in order due to the order of the switching signals produced by controller 18 and applied by way of cable 18b. As illustrated in FIGS. 2A–2B, cable 18b signals are the complement of the cable 18a signals and thus, for example, the $\overline{80}$ signal at terminal 102a is effective to turn on the respective switching stage 105a from 100° to 260°. Thus, stage 105a is actuated to connect resistor 86a in parallel with input resistor 86 to provide a first step 38a of the negative half cycle of waveform 38. Similarly, at 110° a positive going signal is produced at terminal 102b which is effective to actuate stage 105b and to add resistor 86b in the parallel circuit, thereby to increase the absolute gain of amplifier 110. In this manner, the next step 38b is provided for waveform 38. The foregoing continues in the manner previously described to vary the gain of averager amplifier 110 as a function of $\cos w_0 t$. It will be understood that the operation of multiplier 23a is similar to that of multiplier 23 and the operation of multiplier 22a is similar to the operation of multiplier 22.

It will now be understood that, in accordance with the invention, multiplier 23 comprises resistor switching stages which provide for multiplication of the time varying signal by the sine of the analysis frequency $w_0$ by varying the gain of amplifier 88 in accordance with a stepped sinusoidal function. Similarly, multiplication by $\cos w_0 t$ is provided by multiplier 22 since the gain of amplifier 110 is varied as a stepped cosinusoidal function. In this manner, only switching signals are required to be applied to the multipliers rather than sine and cosine reference signals, thereby to substantially decrease the size and complexity of the multiplier and to increase its dynamic range and reliability.

Figure 4:
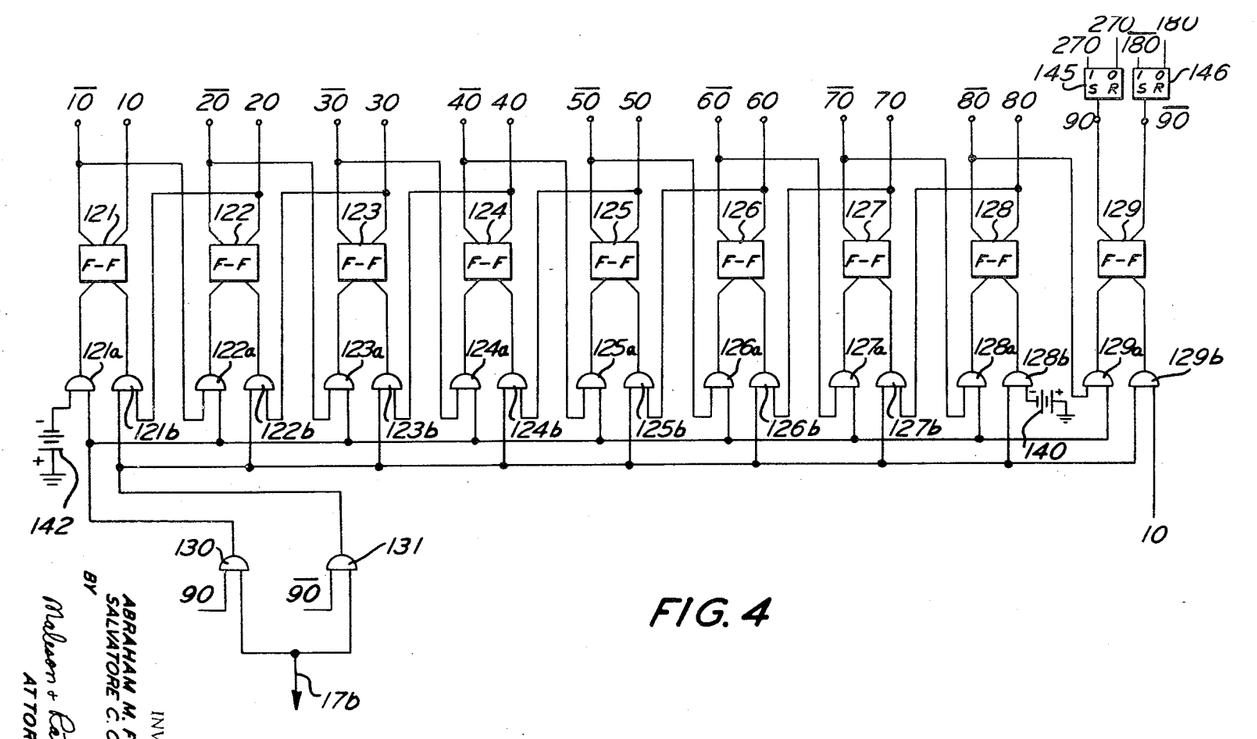
FIG. 4 illustrates in block diagram registers for generating the switching signals for the system of FIG. 1.

Referring now to FIG. 4, there is shown in detail sequence controller 18 for producing (1) switching signals by way of cable 18a having an ordered pattern in accordance with a sinusoidal waveform and (2) switching signals having an ordered pattern in accordance with a cosinusoidal waveform as applied by cable 18b. These signals are illustrated in FIGS. 2A–2B. Specifically, sequence controller 18 comprises a shift register composed of flip-flops 121–128 and a 90° flip-flop 129. It will be seen that the right hand outputs of flip-flops 121–128 provide the switching signals for cable 18a while the left hand outputs of the flip-flops provide the switching signals for cable 18b.

Shift registers are well known in the art and in the register shown in FIG. 4, a differing AND gate is associated with each left and right hand input of each flip-flop 121–128. The left hand output of each flip-flop is connected to an input of an AND gate associated with the left hand side of the next succeeding flip-flop in the register. The left hand output of the last flip-flop 128 of the register is connected to an input of an AND gate 129a associated with the left hand input of 90° flip-flop 129. In addition, the right hand output of each of flip-flops 122–128 is connected to an input of an AND gate associated with the right hand input of the preceding flip-flop. Shift signals are provided by clock pulses occurring every 10° which are produced by master oscillator 17 by way of conductor 17b, FIG. 1.

Conductor 17b is connected to an input of each of AND gates 130 and 131 with the other input of AND gate 130 being connected to the 90 output of flip-flop 129 and the other input of AND gate 131 being connected to the $\overline{90}$ output. In this manner, during the first 90°, a shift right signal is provided at the output of AND gate 131 which is connected to an input of each AND gate 121a–128a, associated with the left hand input of flip-flops 121–128 respectively. Thus, the shift register is shifted right each 10°.

At the termination of 90°, flip-flop 129 is switched and shift left pulses are applied to AND gates 121b–129b and provide for the shifting left of the shift register. The foregoing reversal is provided by an enabling potential produced by battery 140 having its negative side applied to an input of gate 128b. The shift register shifts left until it reaches flip-flop 121 and the reversal is then provided by an enabling potential from a battery 142 having its negative side connected to an input of gate 121a. In order to then switch flip-flop 129, the 10 output of flip-flop 121 is connected to an input of AND gate 129b.

The 90 output of flip-flop 129 is applied to the set side of a flip-flop 145 having its "1" side provide the 270 output and its "0" side provide the $\overline{270}$ output. Similarly, the $\overline{90}$ output of flip-flop 129 is applied to the set side of a flip-flop 146 having its "1" side provided the $\overline{180}$ output and its "0" side provide the output.

It will be understood by those skilled in the art that the above described embodiment is meant to be merely exemplary and that it is susceptible of modification and variation without departing from the spirit and scope of the invention.

What is claimed is:

1. A system for computing the power spectrum of a time varying signal $x(t)$ over a plurality of analysis frequencies comprising, a variable band pass filter for rejecting all but the frequencies in a band around a selected analysis frequency $w_0$, first multiplier means for multiplying the output of said band pass filter times the sine of said selected analysis frequency to produce a first product signal corresponding to $x(t) \sin w_0 t$ and second multiplier means for multiplying the output of said band pass filter times the cosine of said selected analysis frequency to produce a second product signal corresponding to $x(t) \cos w_0 t$, first and second low pass filter means connected to said first and second multiplier means respectively for only passing frequencies below a predetermined substantially low frequency value for averaging said first and second product signals respectively thereby to provide at an output of said first filter means a signal corresponding to the imaginary part of a Fourier transform of $x(t)$ at $w_0$ and to provide at an output of said second filter means a signal corresponding to the real part of said transform, said first and second multiplier means comprising first and second voltage controlled variable gain devices, each of said first and second devices having a plurality of switching stages with each stage comprising switching means in circuit with impedance means, said impedance means associated with said first device having values corresponding to differing segments of a sinusoidal wave form and said impedance means associated with said second device having values corresponding to differing segments of a cosinusoidal wave form, and means for sequentially actuating said switching means associated with said first and said second device thereby to vary the gain of said first device proportional to said differing sinusoidal segments and to vary the gain of said second device proportional to said differing cosinusoidal segments.

2. The system of claim 1 in which there is provided first and second squaring means connected to said first and second filter means respectively for squaring the signals corresponding to the imaginary and real parts of the Fourier transform respectively, and means for adding the output of said squaring means and averaging the resultant signal to obtain a signal proportional to the power spectral density of said time varying signal $x(t)$.

3. The system of claim 2 in which each of said switching means comprises a field effect transistor having one output terminal connected to a respective impedance means.

4. The system of claim 3 in which each plurality of switching stages is connected as an input impedance of the respective variable gain device to provide a stepped varying input impedance for said device.

5. The system of claim 4 in which each said variable gain device is an amplifier having a feedback resistor and capacitor connected across the amplifier.

6. An analyzer system for computing the cross power spectrum between an input and an output time varying signal of a system under test over analysis frequencies having a first and a second channel for operating on said input and output signal respectively comprising means for generating (1) first switching signals having an ordered pattern in accordance with a sinusoidal wave form and (2) second switching signals having an ordered pattern in accordance with a cosinusoidal wave form, each of said first and second channels including (a) filter means for providing at an output the respective time varying signal over a band of frequencies including a selected analysis frequency, (b) first multiplier means including a first variable gain device connected to said generating means for multiplying said filter means output times a stepped sinusoidal wave form of said selected analysis frequency to produce a first product signal and second multiplier means including a second variable gain device connected to said generating means for multiplying said filter means output times a stepped cosinusoidal waveform of said selected analysis frequency to produce a second product signal, (c) first and second low pass filter means connected to said first and second multiplier means respectively for averaging said first and second product signals respectively thereby to provide at an output of said first filter means a signal corresponding to the imaginary part of a Fourier transform of the respective time varying signal and to provide at an output of said second filter means a signal corresponding to the real part of said transform, and computation means responsive to the outputs of said first and second channels for deriving said cross power spectrum.

7. The system of claim 6 in which there is provided for each first and second channel
   (a) first and second squaring means connected to said first and second filter means respectively for squaring the signals corresponding to the imaginary and real parts of the Fourier transform respectively and
   (b) means for adding the output of said squaring means and averaging the resultant signal to obtain a signal proportional to the power spectral density of the respective time varying signal.

8. The system of claim 6 in which for each said channel each of said first and second multiplier means includes an array of switching stages connected between said filter means output and the input of said first and second variable gain device respectively.

9. The system of claim 8 in which each switching stage of each said array comprises a switching circuit connected to a resistor with said stages being connected in parallel and means applying predetermined switching signals in sequence to said switching circuits to sequentially turn on and off said switching circuits thereby to provide a variable input resistance to the respective variable gain device.

10. The system of claim 9 in which each of said switching circuits comprises a field effect transistor having one output terminal connected to a respective resistor and the other output terminal connected to a common terminal with the other transistors of a respective array.

11. The system of claim 10 in which said resistors associated with each said first multiplier means having values to provide substantially equal incremental steps of resultant input resistance as said switching circuits are sequentially turned on from 0°–90° and 180°–270° and turned off from 90°–180° and 270°–360° to produce a stepped sinusoidal varying gain for the respective first variable gain device.

12. The system of claim 10 in which said resistors associated with each said second multiplier means having values to provide substantially equal incremental steps of resultant input resistance as said switching circuits are sequentially turned on from 90°–180° and 270°–360° and turned off from 0°–90° and 180°–270° to produce a stepped cosinusoidal varying gain for the respective second variable gain device.

References Cited

UNITED STATES PATENTS

| | | | |
|---|---|---|---|
| 3,087,674 | 4/1963 | Cunningham et al. | 235—181 X |
| 3,096,479 | 7/1963 | Marks et al. | 324—77 |
| 3,157,781 | 11/1964 | Gruen | 235—181 |
| 3,197,625 | 7/1965 | Ratz | 324—77 X |
| 3,217,251 | 11/1965 | Andrew | 324—77 |

MALCOLM A. MORRISON, Primary Examiner

J. F. RUGGIERO, Assistant Examiner

U.S. Cl. X.R.

324—77